(12) United States Patent
Heggebø

(10) Patent No.: US 12,286,295 B2
(45) Date of Patent: Apr. 29, 2025

(54) ROBOT POSITION DETECTION SYSTEM

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 702 days.

(21) Appl. No.: 17/600,996

(22) PCT Filed: Mar. 19, 2020

(86) PCT No.: PCT/EP2020/057552
§ 371 (c)(1),
(2) Date: Oct. 1, 2021

(87) PCT Pub. No.: WO2020/200799
PCT Pub. Date: Oct. 8, 2020

(65) Prior Publication Data
US 2022/0177223 A1 Jun. 9, 2022

(30) Foreign Application Priority Data

Apr. 3, 2019 (NO) .................... 20190451

(51) Int. Cl.
*B65G 1/04* (2006.01)
*B61B 13/02* (2006.01)
*G06K 7/10* (2006.01)

(52) U.S. Cl.
CPC ............ *B65G 1/0464* (2013.01); *B61B 13/02* (2013.01); *G06K 7/10336* (2013.01); *B65G 2203/0266* (2013.01); *B65G 2203/046* (2013.01)

(58) Field of Classification Search
CPC ...... B61B 13/02; G06K 7/10336; B65G 1/04; B65G 1/0478; B65G 1/0464
See application file for complete search history.

(56) References Cited

U.S. PATENT DOCUMENTS 7,693,757 B2 * 4/2010 Zimmerman ........ G05D 1/0274
705/28
10,803,420 B2 * 10/2020 Jarvis ..................... G05D 1/247
(Continued)

FOREIGN PATENT DOCUMENTS

| CN | 1479908 A | 3/2004 |
| CN | 108698759 A | 10/2018 |

(Continued)

OTHER PUBLICATIONS

Swisslog, "Radwell International, USA (Swisslog reference)", (May 1, 2017), URL: https://www.youtube.com/ atch?v=xcw4F7CAvgw; accessed May 31, 2024.*

(Continued)

*Primary Examiner* — Patrick H Mackey
(74) *Attorney, Agent, or Firm* — Baker Botts L.L.P.

(57) ABSTRACT

An automated storage and retrieval system includes remotely operated vehicles, a main grid in which the vehicles operates, a service grid for placement of vehicles for service, and a control system for controlling the vehicles. The control system includes a data record for the status of a vehicle state for each vehicle. Each remotely operated vehicle includes a label and the service grid includes a reader for reading the label so as to identify each vehicle passing the reader. The control system receives a signal from the reader and, upon receipt, compares the data record with an observed vehicle state of the identified vehicle and either updates the data record with the observed vehicle state or indicates to an operator that a difference exists between the observed vehicle state and the vehicle state on the control system.

15 Claims, 8 Drawing Sheets

(56) References Cited

U.S. PATENT DOCUMENTS

| | | | |
|---|---|---|---|
| 10,988,313 B2* | 4/2021 | Phan-Quiroga | B65G 1/1378 |
| 11,220,400 B2* | 1/2022 | Lisso | B65G 1/0414 |
| 2002/0070862 A1 | 6/2002 | Francis et al. | |
| 2007/0061041 A1* | 3/2007 | Zweig | G05D 1/0261 700/245 |
| 2014/0343717 A1* | 11/2014 | Dorval | G05D 1/0297 700/217 |
| 2015/0081088 A1 | 3/2015 | Lyon et al. | |
| 2017/0361465 A1 | 12/2017 | Zevenbergen | |
| 2023/0028034 A1* | 1/2023 | Gravelle | B65G 1/0485 |

FOREIGN PATENT DOCUMENTS

| | | | |
|---|---|---|---|
| EP | 1258829 A1 | 11/2002 | |
| GB | 2539562 A | 12/2016 | |
| JP | 2005/112564 A | 4/2005 | |
| NO | 317366 B1 | 10/2004 | |
| WO | 2008069625 A1 | 6/2008 | |
| WO | 2008/091586 A1 | 7/2008 | |
| WO | 2012049520 A1 | 4/2012 | |
| WO | 2014/090684 A1 | 6/2014 | |
| WO | 2014/145437 A1 | 9/2014 | |
| WO | 2014/160403 A2 | 10/2014 | |
| WO | 2015/193278 A1 | 12/2015 | |
| WO | 2016/166294 A1 | 10/2016 | |

OTHER PUBLICATIONS

Office Action issued in corresponding Chinese Application No. 2020800413830; mailed Dec. 19, 2022 (14 pages).

"https://www.youtube.com/watch?v=xcw4F7CAvgw" (2 pages).

International Search Report issued in PCT/EP2020/057552, mailed on Apr. 3, 2019 (5 pages).

Written Opinion of the International Searching Authority issued in PCT/EP2020/057552, mailed on Apr. 3, 2019 (8 pages).

Norwegian Search Report issued in counterpart Norwegian Patent Application No. 20190451, mailed on Jan. 7, 2019 (2 pages).

Swisslog, "Radwell International, USA (Swisslog reference)", (May 1, 2017), pp. 1-2, URL: https://www.youtube.com/watch?v=xcw4F7CAvgw; Jun. 16, 2020.

Tove Kathrine Rognan, Office action in Norwegian patent application No. 20190451, Norwegian Industrial Property Office, mailed Jun. 19, 2024, 8 pages.

* cited by examiner

ROBOT POSITION DETECTION SYSTEM

The present invention is directed to an automated storage and retrieval system for setting an updated vehicle state for a remotely operated vehicle while operating on the automated storage and retrieval system.

BACKGROUND AND PRIOR ART

FIGS. 1A and 1C disclose a typical prior art automated storage and retrieval system 1 with a framework structure 100. FIGS. 1B and 1D disclose a prior art container handling vehicle 200,300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminium profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 1C, $Z=8$ identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell $X=10, Y=2, Z=3$. The container handling vehicles 200,300 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 200 having a footprint generally corresponding to the lateral area defined by a grid column 105 to travel along a row of grid columns even if another container handling vehicle 200 is positioned above a grid column neighbouring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighbouring grid cells are arranged in contact with each other such that there is no space there-between.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

The automated storage and retrieval system may further comprise a dedicated area where container handling vehicles are moved into for the purpose of maintenance and/or service.

The dedicated area may be a service grid system comprising a service rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining the service grid of service grid cells, and wherein the service grid is connected to the storage grid such that the plurality of remotely operated vehicles can enter or exit the service grid from or to the storage grid.

For an automated storage and retrieval system comprising multiple service areas, it could be difficult for the operator to keep a total overview of the vehicle states of each vehicle. Manual registration of a vehicle state has potentially multiple sources of error, such as human error.

A dangerous situation may arise when a vehicle has a wrong system status in relation to where it is physically located. For example, a vehicle may have an "in operation" status while physically being located in a service grid, thereby potentially being in danger for the human operators or equipment if it starts to run or operate in the service (maintenance) grid.

Likewise, the vehicle may be in an "out of service mode", while physically being located on a storage grid, thereby potentially being in collision danger for other remotely operated vehicles operating on the common storage grid.

In view of the above, it is desirable to provide device and a method for registering and updating the state of the vehicle to avoid dangerous situations that can cause damage to equipment or personnel.

An objective of the invention is to provide a system that can easily and effectively register and updating the vehicle information and status.

SUMMARY OF THE INVENTION

The invention is related to an automated storage and retrieval system comprising;

a plurality of remotely operated vehicles, a main grid in which the plurality of remotely operated vehicles operates, a service grid for placement of remotely operated vehicles for service, and a control system for controlling the plurality of remotely operated vehicles, the control system comprising a data record for the status of a vehicle state for each remotely operated vehicle.

The main grid comprises a main rail system comprising at least a first set of parallel rails arranged in a horizontal plane (P,P1) and extending in a first direction (X), and at least a second set of parallel rails arranged in the horizontal plane (P,P1) and extending in a second direction (Y) which is orthogonal to the first direction (X), the first and second sets of rails together defining the main grid of main grid cells.

The service grid comprises a service rail system comprising at least a first set of parallel rails arranged in a horizontal plane (P,P1) and extending in a first direction (X), and at least a second set of parallel rails arranged in the horizontal plane (P,P1) and extending in a second direction (Y) which is orthogonal to the first direction (X), the first and second sets of rails together defining the service grid of service grid cells.

The main grid is connected to the service grid such that the plurality of remotely operated vehicles can enter or exit the service grid from or to the main grid. The main grid may be a storage grid where container handling vehicles operates for storing and retrieving storage containers, or the main grid may be a delivery grid where storage containers are transported on top of delivery vehicle to/from an access station.

The automated storage and retrieval system may comprise a storage grid connected to a first service grid and/or a delivery grid connected to a second service grid. The storage grid and the delivery grid may be located on different levels (horizontal planes P and P1). Thus, the first and second service grids may be separate service grids located at different horizontal planes.

Thus, the service grid may be arranged at a horizontal plane P2 which is either at the same plane as the storage grid P or at the same plane as delivery grid P1.

The remotely operated vehicles may be container handling vehicles and/or delivery vehicles.

Each remotely operated vehicle comprises at least one label. The at least one label comprising individual remotely operated vehicle information, and wherein the service grid comprises at least one reader for reading the at least one label of each remotely operated vehicle passing the at least one reader so as to identify each remotely operated vehicle and wherein the control system is arranged to receive a signal from the reader and upon receipt compare the data record with an observed state of the identified remotely operated vehicle.

The term "vehicle state" is referred to a locational and/or operational state of the vehicle such as "in service area", "not in service area", "in operation" or "not in operation", etc.

Different operational states may be defined or created based on the need for assessing a status of the vehicle. The observed vehicle state may be compared to a vehicle record state for determining whether the vehicle states are the same.

The control system is configured to then either update the data record with the observed vehicle state or indicate to an operator that a difference exists between the observed vehicle state and the vehicle state on the control system.

In particular the invention is directed to such an automated storage and retrieval system in the case when the vehicle is entering or exiting from one grid system to another, such as from a main grid to a service grid.

The service grid may comprise a dedicated service area where the remotely operated vehicles are located for service and maintenance.

In the service area the remotely operated vehicles may be set in an "out-of-service" mode vehicle state, which means that they are not in an "in operation" mode vehicle state, e.g., as they would be in normal operation when handling storage containers on the storage grid.

The at least one reader may be both a reader and a transmitter such that it communicates with the control system, and wherein the at least one reader is able to transmit data representing the remotely operated vehicle to the control system.

The control system may use the information from the detection system (i.e. reader) to keep track of where the remotely operated vehicles are located (e.g., in the service area or in the main grid).

The control system may use the information from the detection system to detect mismatch between recorded state (logical state) and observed state (physical state). If the recorded state and the observed state do not match, the system may ask the operator to confirm the vehicle state and update the data record with the observed vehicle state such that the recorded state and the observed state are the same. This updating may be performed manually or automatically.

Thus, the control system may be configured so that the information received from the reader automatically overrides the recorded state of the vehicle. In this way the vehicle state will be set automatically according to the information received from the reader.

Alternatively, the control system may be configured to inform an operator that the recorded state and the observed state of the vehicle do not match. The operator may then have to set manually the correct vehicle state in the data record on the control system.

If the vehicle is in an out-of-service state, the control system may use the information to stop communicating with the remotely operated vehicles. This will reduce the risk of transmitting an operating command to the vehicle while it is located in the service grid.

To maintain the safety, the vehicle may be provided with a safety barrier which may be activated by a switch or button. This activation switch or button when activated, isolates the drive motors and thus make the vehicle harmless. In this mode, the vehicle can still receive radio signals, but it cannot execute any commands since it lacks the motor power.

The at least one reader may be arranged in a plane above the horizontal plane (P2) of the service rail system. Preferably, the at least one reader is arranged on the same horizontal plane as the at least one label, such that said reader may easily read said at least one label situated on the remotely operated vehicle as it passes the at least one reader.

The at least one reader may also be located in a horizontal plane below the horizontal plane (P2) of the service rail system for reading the at least one label from below, or the at least one reader may be located at a horizontal plane above the remotely operated vehicle such that it may read the at least one label from above. In these embodiments the at least one reader may be located at an underside of the remotely operated vehicle or on top of the remotely operated vehicle. At the underside the at least one reader may be connected to the frame of the grid system, connected to a floor support or directly to a floor. When located above, the at least one reader may be connected to a frame, a port or device hanging from the ceiling or other overhead structure.

The location of the at least one reader in the service rail system may define, at least in part, a vehicle passage at which each remotely operated vehicle crossing the vehicle passage is identified by the at least one reader reading the at least one label.

The at least one reader may be positioned at a point of entry or exit of the service grid.

The at least one reader may be located at the transition between the main grid and the service grid, or the at least one reader may be located in the service grid at a transition to a service area where service personnel or vehicles undergoing maintenance may be present. Thus, the service area may be defined as a dedicated area within the service grid where the remotely operated vehicles are placed for maintenance or service. The entire service grid may correspond to a service area or at least a part of the service grid may be defined as the service area.

A vehicle passage connecting the main grid to a service area of the service grid may comprise a reader connected to a service grid cell in the first direction (X) or in the second direction (Y). Thus, the vehicle may pass through the vehicle passage in a forward/backwards direction (Y-direction) or a sideways direction (X-direction). The vehicle may therefore enter or exit the service area in any of grid directions X or Y in accordance with the rail layout. Furthermore, the service area may comprise one or more vehicle passages for the vehicle in an X and/or Y direction.

For example, the service area may comprise two passageways such that the remotely operated vehicle may enter the service area at a first passageway and exit the service area at a second passageway.

The vehicle passage may be in the form of a service grid port that the vehicle passes through, for example, in the form of a gateway into the service grid or service area. The vehicle passage may instead be in the form of a tunnel, corridor or a length of rail system that leads to the service area.

The transition between the main grid and the service grid may be provided with a physical barrier (i.e. walls) separating the main grid from the service grid. Thus, protecting the human workers (service personnel) working in the service area from the moving vehicles operating on the main grid. A service grid door may be provided on the physical barrier such that the remotely operated vehicles may enter or exit the service grid through the service grid door. The vehicle passage may be positioned adjacent to a service grid door which can be opened or closed automatically or manually.

The vehicle passage may comprise two readers arranged opposite each other on a service grid cell in the first direction (X) or opposite each other on a service grid cell in the second direction (Y).

The remotely operated vehicle may comprise a front part, a back part and two side parts, and wherein a first label is arranged at one side part such that the label can be read by one of the readers in the second direction (Y).

The remotely operated vehicle may comprise a front part, a back part and two side parts, and wherein a second label may be arranged at the front part or the back part such that the second label can be read by one of the readers in the first direction (X).

In these embodiments, the reader may read the label and register in what position the vehicles are entering the service area and/or exiting the service area. For example, the vehicle may enter the service area in forward facing direction or it may enter the service area in a backwards facing direction (turned 180°). In the case the label is located at a left side of the vehicle, the reader at the left side will read the label and the vehicle facing direction will be detected. If the vehicle in turned 180°, the reader at the right side will be able to read said label and detect that the vehicle has turned 180°.

If, during maintenance and/or service, the vehicle has been lifted and turned 180°, the reader will detect the vehicle direction and update the vehicle status at the moment the vehicle is passing through the vehicle passage.

Hence, the reader is able to provide information of which vehicle is entering the service grid and in what direction it enters and exits.

The system may be operated such that it automatically registers a vehicle moving in or out of the service grid and in particular the service area. The reader may be a sensor adapted to read the individual information provided in the at least one label attached to each of the remotely operated vehicles. The label may be a passive id (rfid, bar code, etc.) which may increase the reliability of the detection system since it may detect a vehicle in an "out-of-service" which means the vehicle has been "shut down" and manually moved through the vehicle passage.

If a malfunctioning vehicle is manually moved into the service area (a service person physically moving the vehicle into the service area), the vehicle information is updated in the control system and a correct vehicle state is provided manually or automatically. By activating the safety barrier, the vehicle can no longer act on instructions intended for the vehicle on the main grid. This means that, the vehicle will not start to operate in the service area as if it was located on the main grid.

The automatic detection of vehicles moving in or out of service area has several benefits: it reduces the possibility of hazardous situations, increases system operation time and reduces the possibility of material damage (e.g., a vehicle crash).

When a remotely operated vehicle is taken into the service area, the control system drives the vehicle to a cell of the main grid located in front of the service grid door. The operator may unlock the service grid door via the control system and then manually open the door.

When the door is confirmed open (sensors), the control system will change the parameters of the vehicle so that it will run at reduced speed and acceleration. In order to move the vehicle from the outside of the service grid door to a predefined cell inside (service grid side) of the door, the operator must hold a special scarce combination on the keyboard associated with the control system interface. If the buttons are released during this movement, the vehicle will stop and turn to fail.

If the above procedure is done correctly, the remotely operated vehicle will drive through the door, passing the vehicle passage and park in the service area. Preferably at a predefined service grid cell at which the service personnel make take over the control of the vehicle. The operator may then close the door and the vehicle state may be updated to "out-of-service" state automatically or manually. When the vehicle state is set to "out-of-service" the control system will stop communicating with the vehicle.

To maintain security, the operator may activate the safety barrier (put the vehicle in "offline" mode) when the vehicle is located in the predefined service grid cell. This will isolate the engines and thus make the vehicle harmless such that the vehicle may be manually moved inside the service area (to any cells).

In a way, this is a double safeguard for the service personnel working in the service area, preventing the vehicle to start running or operating inside the service area.

When the service and maintenance are finished, the vehicle may be manually moved back to the predefined service grid cell and the safety barrier switch turned back to "online mode". The control system may gain control of the remotely operated vehicle and move the vehicle back to the main grid. Thus, the procedure for opening the service grid door has to be made again for allowing the vehicle to enter back to the main grid.

The main grid may be a storage grid and the plurality of remotely operated vehicles may be container handling vehicles.

Alternatively, the main grid may be a delivery grid and the plurality of remotely operated vehicles may be delivery vehicles.

A first service grid may be connected to the storage grid and/or a second service grid may be connected to the delivery grid. A remotely operated vehicle operating on the main grid (storage and/or delivery grid) may move to/from their respective connected service grid.

The invention is also directed to a method of identifying a remotely operated vehicle in an automated storage and retrieval system comprising:

a plurality of remotely operated vehicles,
a main grid on which the plurality of remotely operated vehicles operates,
a service grid for placement of remotely operated vehicles which require service, and
a control system for controlling the plurality of remotely operated vehicles, the control system comprising a data record for the status of a vehicle state for each remotely operated vehicle. The main grid comprises a main rail system comprising at least a first set of parallel rails arranged in a horizontal plane (P,P1) and extending in a first direction (X), and at least a second set of parallel rails arranged in the horizontal plane (P,P1) and extending in a second direction (Y) which is orthogonal to the first direction (X), the first and second sets of rails together defining the main grid of main grid cells.

The service grid comprises a service rail system comprising at least a first set of parallel rails arranged in a horizontal plane (P,P1) and extending in a first direction (X), and at least a second set of parallel rails arranged in the horizontal plane (P,P1) and extending in a second direction (Y) which is orthogonal to the first direction (X), the first and second sets of rails together defining the service grid of service grid cells.

The main grid is connected to the service grid such that the plurality of remotely operated vehicles can enter or exit the service grid from the main grid.

The main grid may be a storage grid where container handling vehicles operates for storing and retrieving storage containers, or the main grid may be a delivery grid where storage containers are transported on top of delivery vehicle to/from an access station.

The automated storage and retrieval system may comprise a storage grid connected to a first service grid and/or a delivery grid connected to a second service grid. The storage grid and the delivery grid may be located on different levels (horizontal planes P, P1). Thus, the first and second service grids may be separate service grids located at different horizontal planes P and/or P1.

Thus, the service grid may be arranged at a horizontal plane P2 which is either at the same plane as the storage grid P or at the same plane as delivery grid P1.

The remotely operated vehicles may be container handling vehicles and/or delivery vehicles. Each remotely operated vehicle comprises at least one label comprising individual remotely operated vehicle information, and wherein the service grid comprises at least one reader for reading the at least one label of each remotely operated vehicle such as to identify each remotely operated vehicle.

The method comprises the steps of:
operating or moving the remotely operated vehicle on the main rail system towards the service grid,
utilizing the at least one reader of the service grid to read the vehicle information comprised in the at least one label of the remotely operated vehicle,
updating a data record for the remotely operated vehicle in the control system to set an updated vehicle state.

The control system is arranged to receive a signal from the reader and upon receipt compare the data record with an observed vehicle state of the identified remotely operated vehicle. Depending on how the control system is configured, the control system then either updates the data record with the observed vehicle state or indicates to an operator that a difference exists between the observed vehicle state and the vehicle state on the control system.

BRIEF DESCRIPTION OF THE DRAWINGS

The following drawings depict exemplary embodiments of the present invention and are appended to facilitate the understanding of the invention.

FIG. 1C shows the complete system and FIG. 1B and FIG. 1D shows examples of system operable prior art container handling vehicles.

FIG. 2A shows a single-track system, FIG. 2B shows a double track system 2B and FIG. 2 C shows a double track system indicated width and length of a container handling vehicle grid cell.

DETAILED DESCRIPTION OF THE INVENTION

Figure 1:
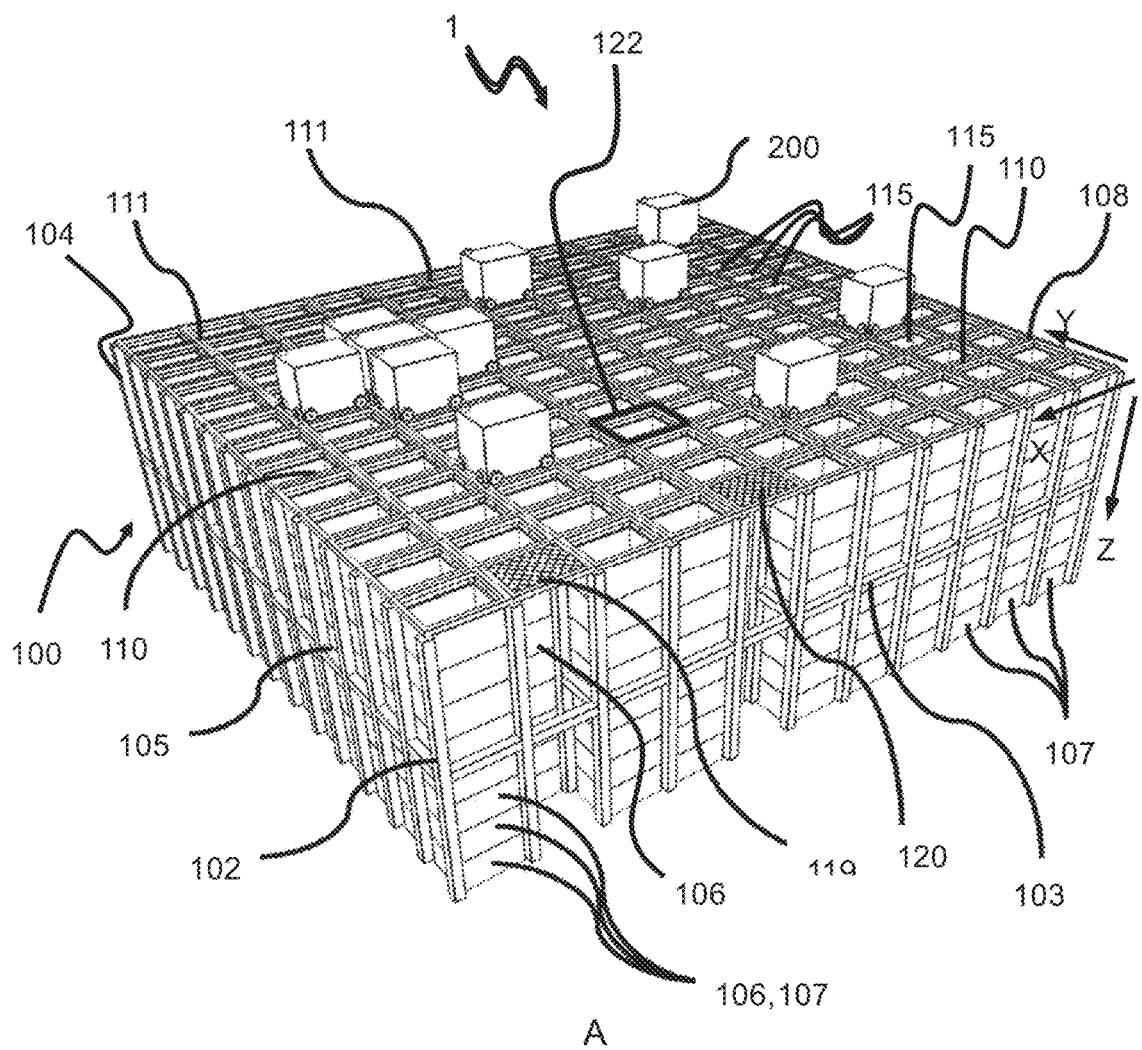
FIG. 1 A-D are perspectives view of a prior art automated storage and retrieval system, where FIG. 1A
Figure 1:
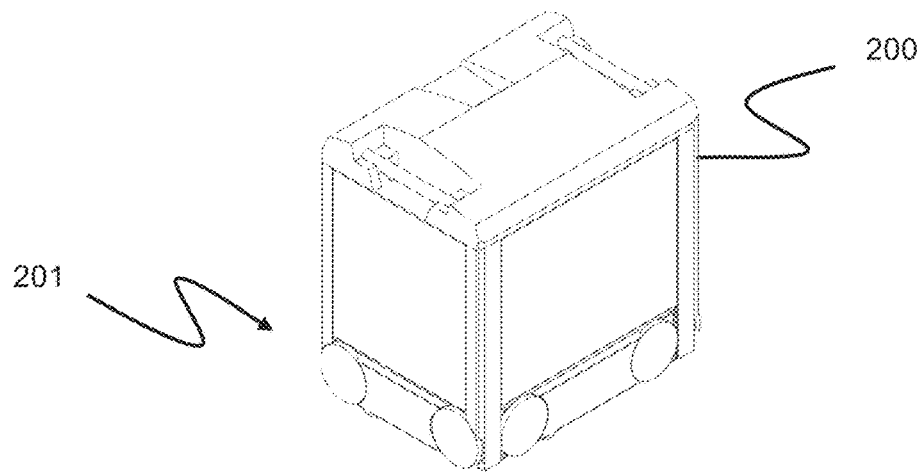
Figure 1:
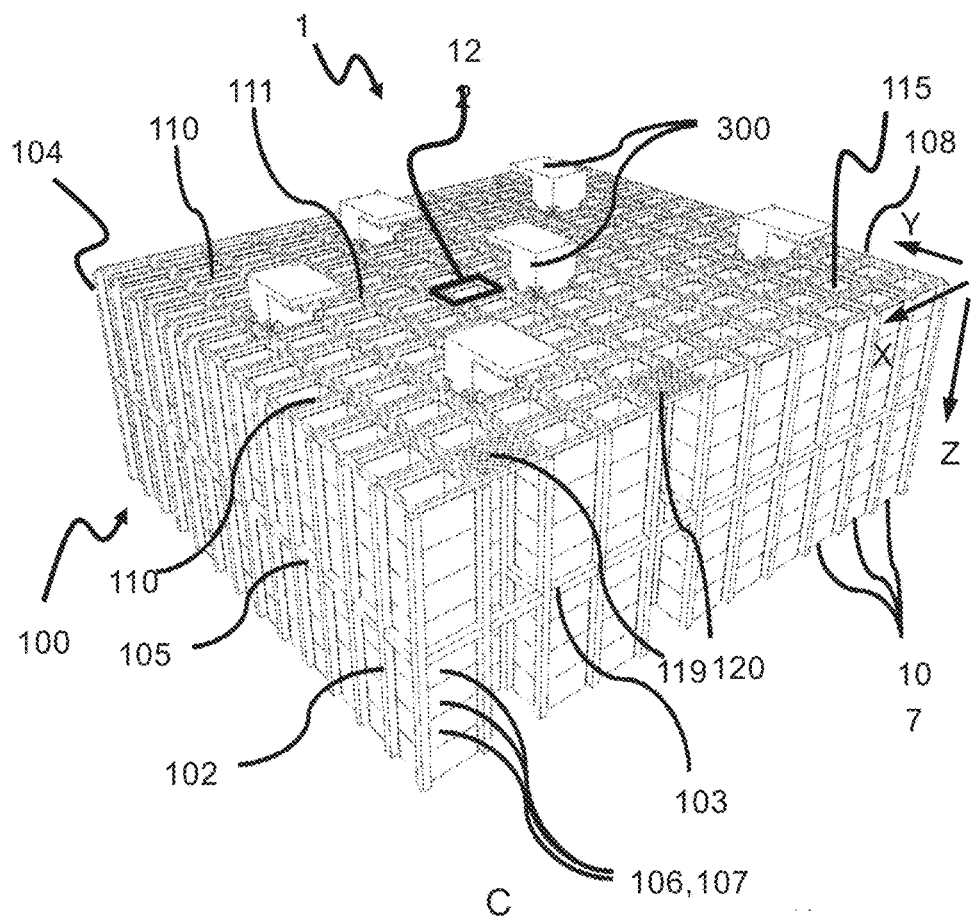
Figure 1:
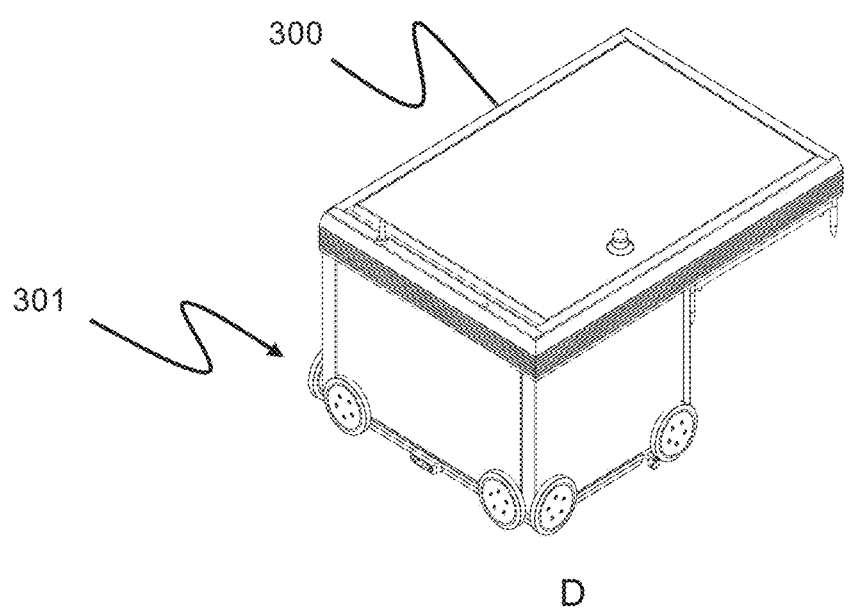

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 105, where the width and length of the framework corresponds to the width and length of 13 and 11 grid columns 105, respectively. The top layer of the framework 100 is a rail system 108 onto which a plurality of container handling vehicles 200,300 are operated.

Figure 2:
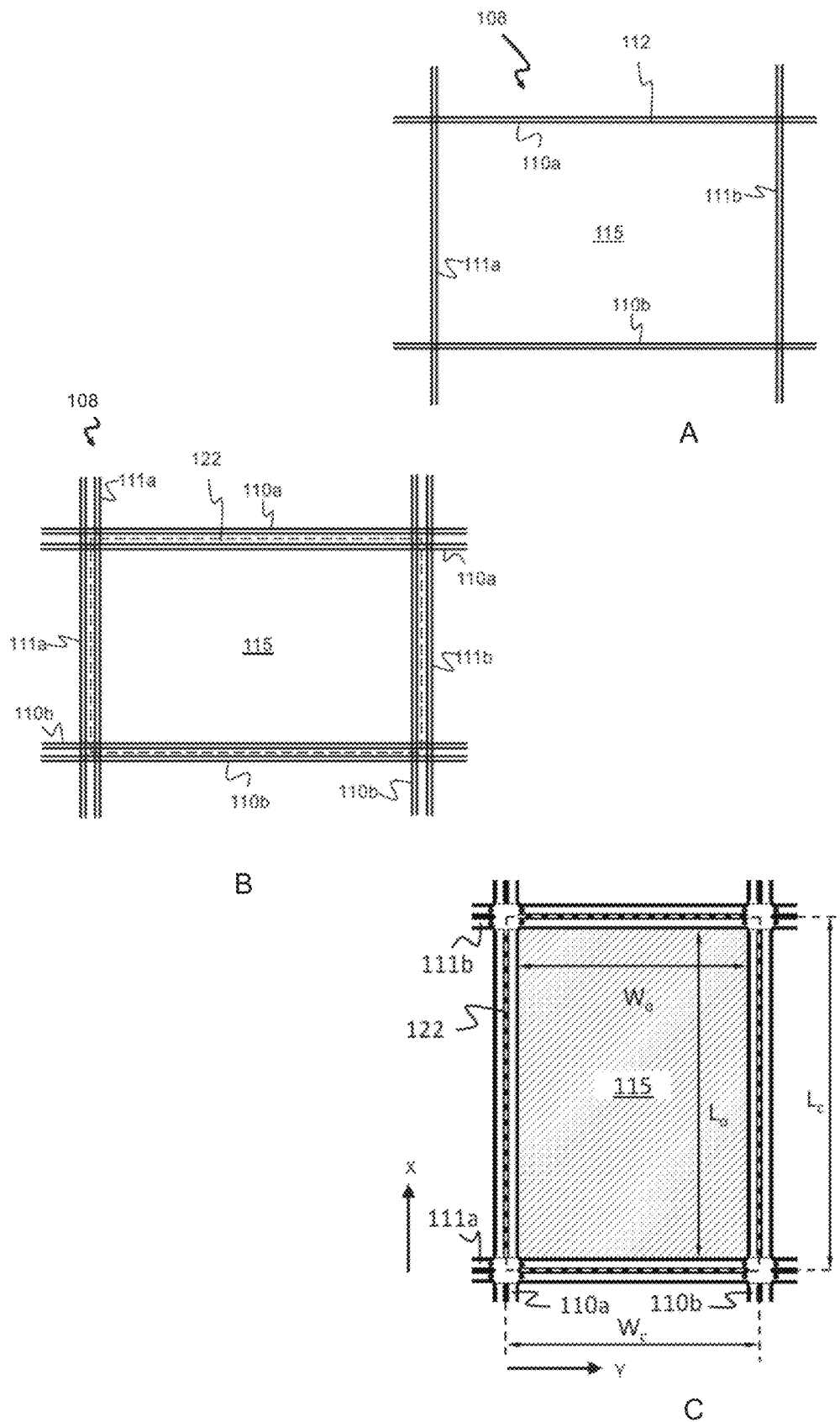
FIG. 2 A-C is a top view of a container handling vehicle rail system, where

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid cells 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

The rail system 108 may be a single-track system, as is shown in FIG. 2A. Alternatively, the rail system 108 may be a double track system, as is shown in FIG. 2B. Details of the single and double track system are disclosed this specification under the section of background and prior art. The rail system 108 may also be a combination of single-track system and double-track system.

Figure 3:
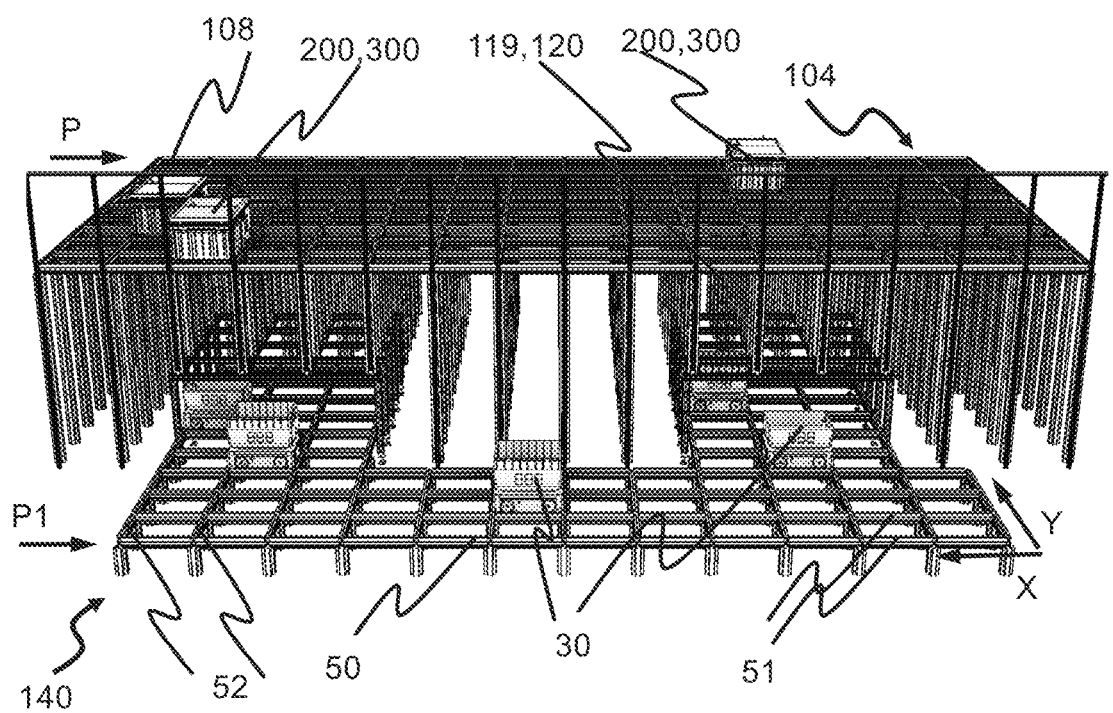
FIG. 3 is a perspective view of an exemplary embodiment of an automated storage and retrieval grid and a delivery system comprising delivery rail system and delivery vehicles.
Figure 4:
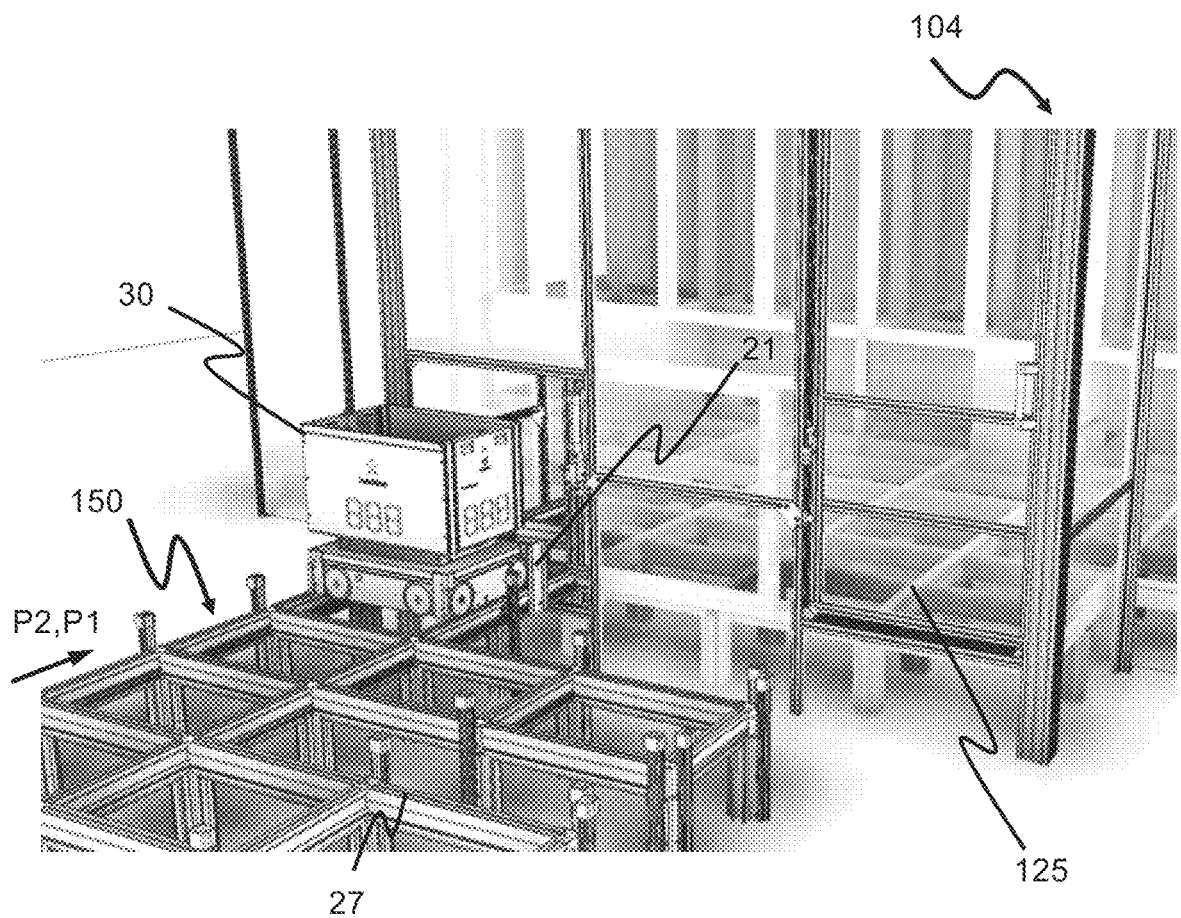
FIG. 4 is another perspective view of an exemplary embodiment of a delivery system comprising delivery rail system and a service area of a service grid.
Figure 5:
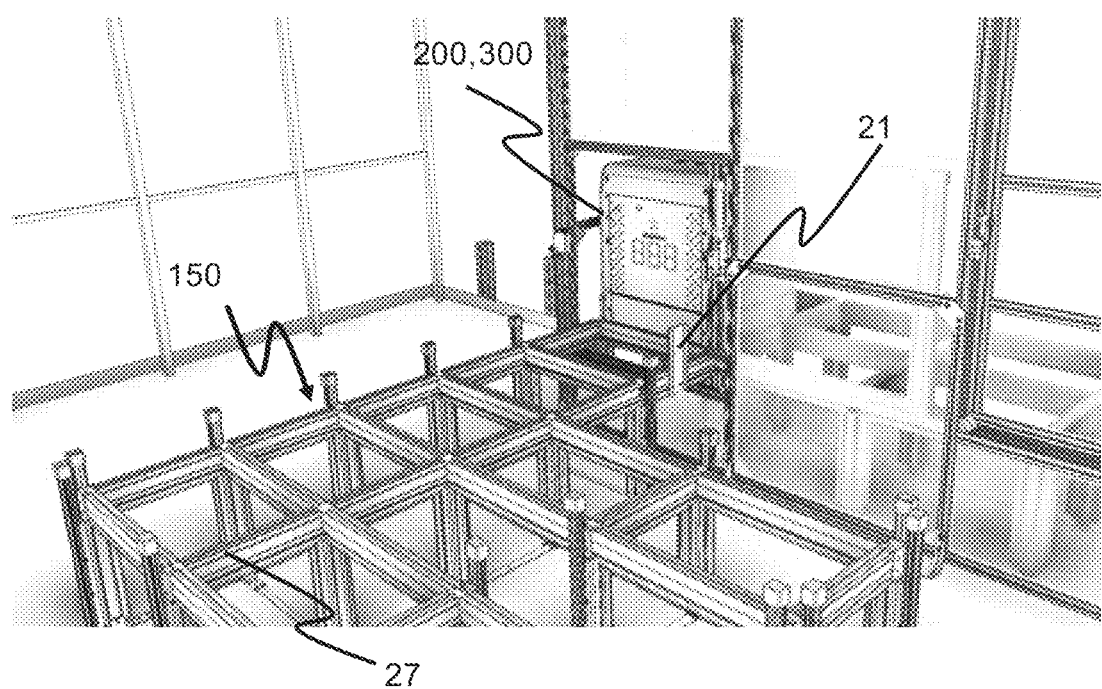
FIG. 5 illustrates a remotely operated vehicle and a service area of a service grid.
Figure 6:
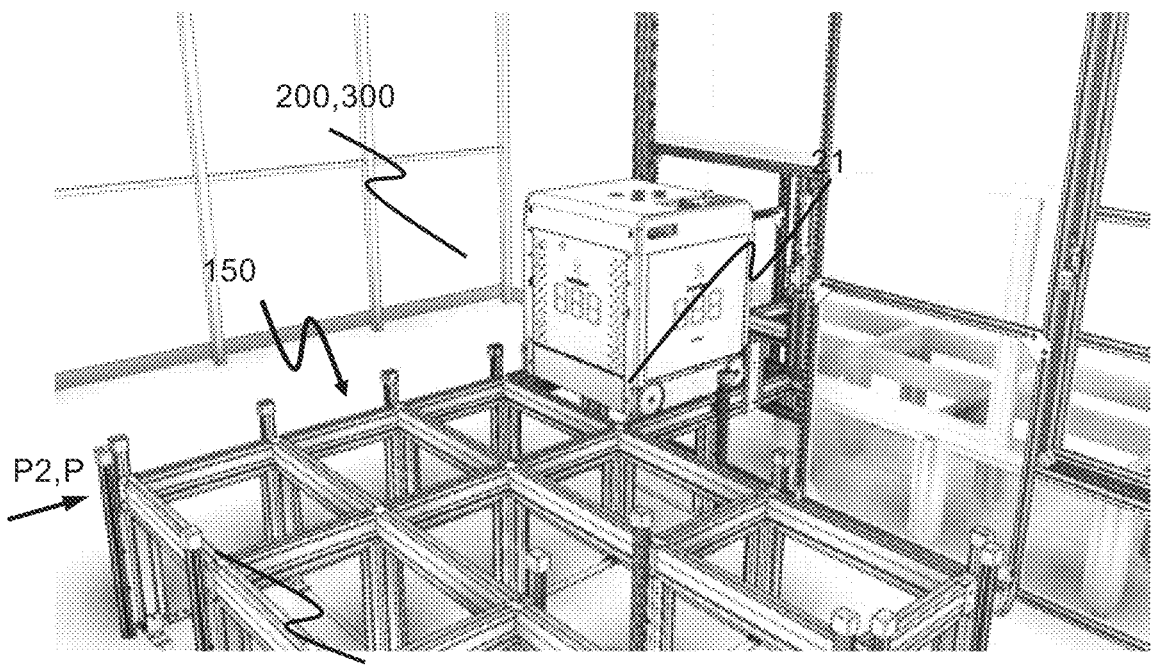
FIG. 6 illustrates the embodiment in FIG. 5, while the vehicle is entering the service area and passing the reader.
Figure 7:
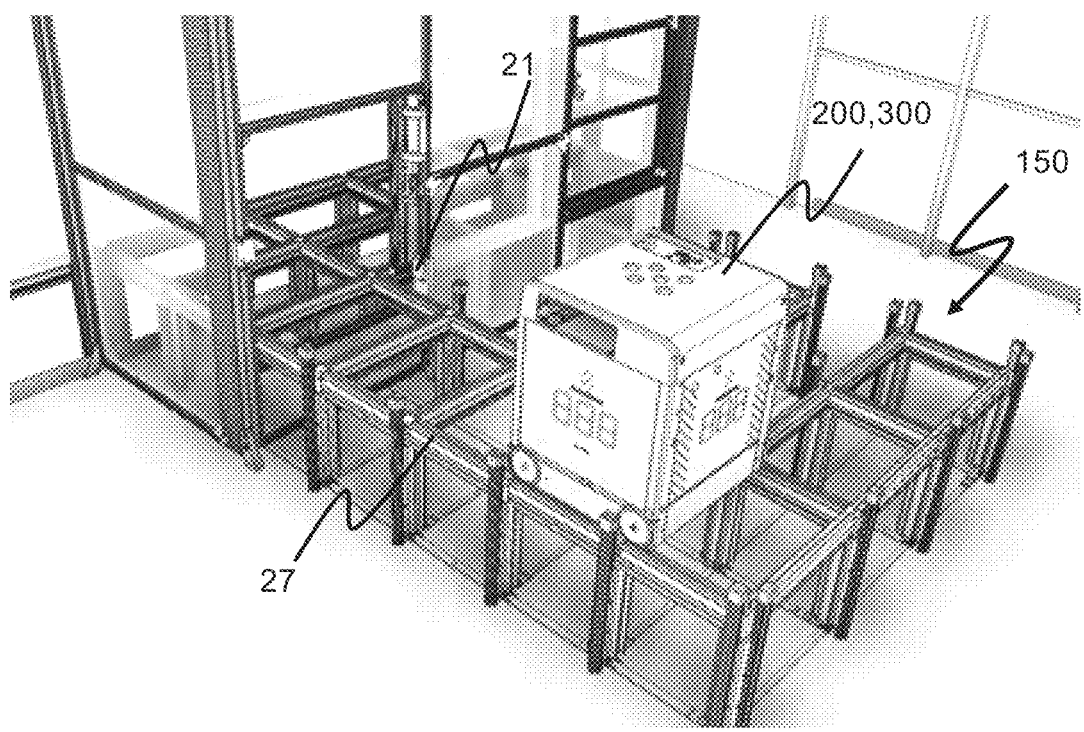
FIG. 7 illustrates a remotely operated delivery vehicle located in the service area of a service grid.
Figure 8:
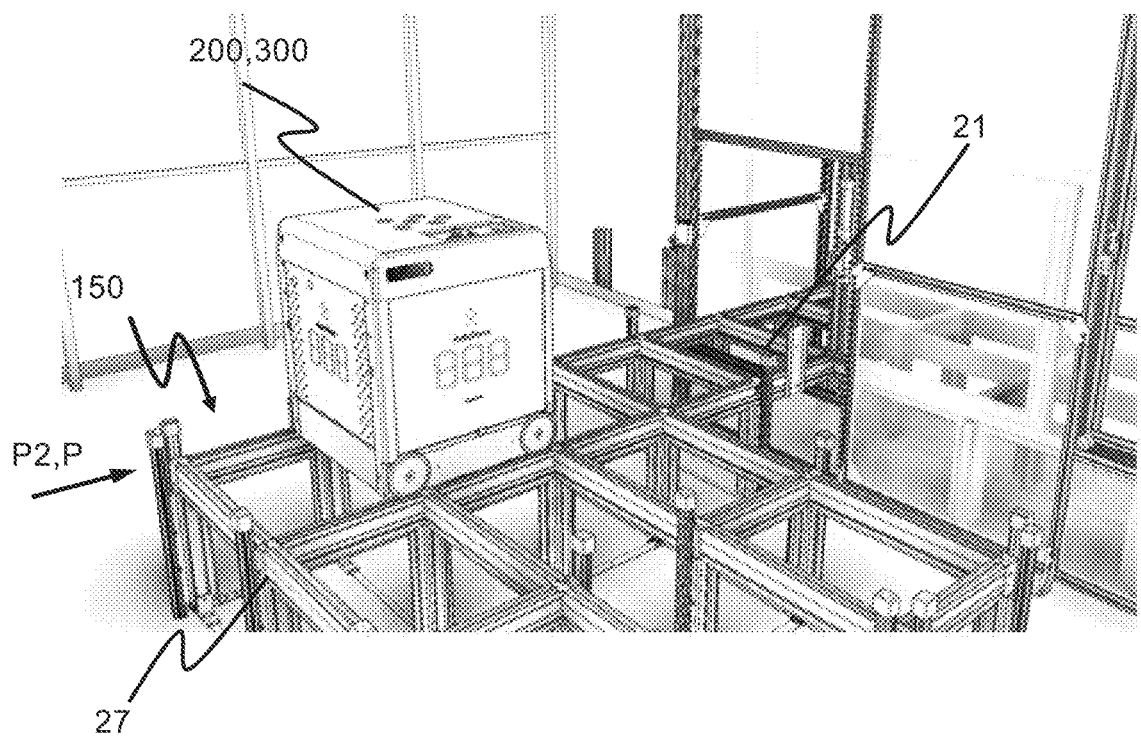
FIG. 8 illustrates the embodiment in FIG. 7 from a different angle.

Perspective views of an automated storage and retrieval system are shown in FIGS. 3 and 4. The automated storage and retrieval system comprises an automated storage and retrieval grid 104, onto which a plurality of container handling vehicles 200,300 operates, and a delivery system 140 comprising a delivery rail system 50 onto which a plurality of delivery vehicles 30 operates.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 200,300.

The rail system 108 comprises a first set of parallel trails 110 arranged in a horizontal plane (P) and extending in a first direction (X) and a second set of parallel rails 111 arranged in the horizontal plane (P) and extending in a second direction (Y) which is orthogonal to the first direction (X). The first and second sets of rails 110, 111 form a grid pattern in the horizontal plane (P) comprising a plurality of adjacent grid cells 122. Each grid cell 122 displays a grid opening defined by a pair of neighbouring rails of the first set of rails 110 and a pair of neighbouring rails of the second set of rails 111.

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

The delivery system 140 may be connected to the storage system 1, such that a delivery vehicle 30 operating on the delivery grid 125, may receive a storage container 106 for transport between the storage system 1 and container accessing station.

The delivery system 140 comprises one or more of the delivery vehicles 30. The delivery vehicles 30 are configured to receive and support one or more storage containers 106 for transport between one or more delivery columns 119,120 of the storage grid 104 and one or more predetermined positions outside the storage grid 104. The predetermined positions may for example be a second location, a container accessing station, a conveyor line or a transport vehicle such as a truck.

The delivery system 140 may further comprise a delivery rail system 50 situated below a delivery port of the one or more delivery columns 119,120. The delivery grid 125 is located on a horizontal plane (P1) which is arranged below the horizontal plane (P) of the storage grid 104.

As shown in FIGS. 3 and 4, the delivery rail system 50 may be constructed in the same way or a similar way as the rail system 108 for the container handling vehicles 200,300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

The delivery rail system 50 may also be a double rail system, as is shown in FIG. 2B, thus allowing a delivery vehicle 30 having a footprint generally corresponding to the lateral area defined by a delivery grid column to travel along a row of grid columns even if another delivery vehicle 30 is positioned above a grid column neighbouring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening being delimited by a pair of rails of the first rails and a pair of rails of the second set of rails.

The pair of rails in the X-direction defines parallel rows of delivery grid cells running in the X direction, and the pairs of rails in the Y direction defines parallel rows of delivery grid cells running in the Y direction.

The service grid 150 may either be connection with the main grid 104 or the delivery grid 125 since these two grids are locate at different horizontal planes (P,P1). Thus, the service grid 150 may be arranged at a horizontal plane P2 which is either at the same plane as plane P of the storage grid or plane P1 of the delivery grid.

A storage and retrieval system may comprise a first service grid connected to the main grid 104 and/or a second service grid connected to the delivery grid 125. The first and second service grids 150 may be separate grids located on different horizontal planes. In FIG. 4, the delivery grid 125 is connected to the service grid 150 such that the delivery vehicle 30 may enter or exit the service grid 150 from or to the delivery grid 125. Thus, the service grid 150 constitutes the service area.

Thus, the rails of the main grid (delivery grid) and the service grid may all be identical components.

Also shown in FIG. 4, the delivery grid 125 is separated from the service grid 150 by walls or other barrier, in this case made of a transparent material such as toughened glass. The delivery vehicle 30 may enter/exit the service grid 150 through a port 20 provided in the glass wall.

The delivery vehicle 30 comprises at least one label 25 comprising individual remotely operated vehicle information, and wherein the service grid 150 comprises at least one reader 21 for reading the at least one label 25 of the delivery vehicle 30 such as to identify each delivery vehicle 30 and wherein a control system is arranged to receive a signal from the reader and upon receipt compare the data record with an observed vehicle state of the identified remotely operated vehicle.

The control system is configured to then either update the data record with the observed vehicle state or indicate to an operator that a difference exists between the observed vehicle state and the vehicle state on the control system.

Thus, the at least one reader 21 communicates with the control system (not shown) and wherein the at least one reader 21 is able to transmit data representing the remotely operated vehicle 30 to the control system.

The location of the at least one reader 21 in the service rail system 27 may define a vehicle passage where each delivery vehicle 30 passing through the vehicle passage is identified by the at least one reader 21 reading the at least one label 25.

The vehicle passage may be in the form of a service grid port 20 that the vehicle passes through, for example, in the form of a gateway into the service grid or service area. The vehicle passage may instead be in the form of a tunnel, corridor or a length of rail system that leads to the service area.

The vehicle identification also applies to a container handling vehicle 200,300 operating on a storage grid 104 connected to a service grid 150 such that the container handling vehicle 200,300 may enter or exit the service grid 150 from or to the storage grid 104, as illustrated in FIGS. 5,6,7 and 8 and be identified by the at least one reader.

Thus, the rails of the main grid (storage grid) and the service grid may all be identical components.

The service grid 150 defines a service area for placement of container handling vehicles 200,300 which require service. The container handling vehicle 200,300 comprises at least one label 25 comprising individual remotely operated vehicle information, and wherein the service grid 150 comprises at least one reader 21 for reading the at least one label (not shown) of the container handling vehicle 200,300 such as to identify the container handling vehicle 200,300 and wherein the control system (not shown) is arranged to receive a signal from the reader and upon receipt update the data record with an observed vehicle state of the identified remotely operated vehicle.

The reader may be connected to a service grid cell to identify the remotely operated vehicle passing in a first direction (X) or in a second direction (Y).

Figure 9:
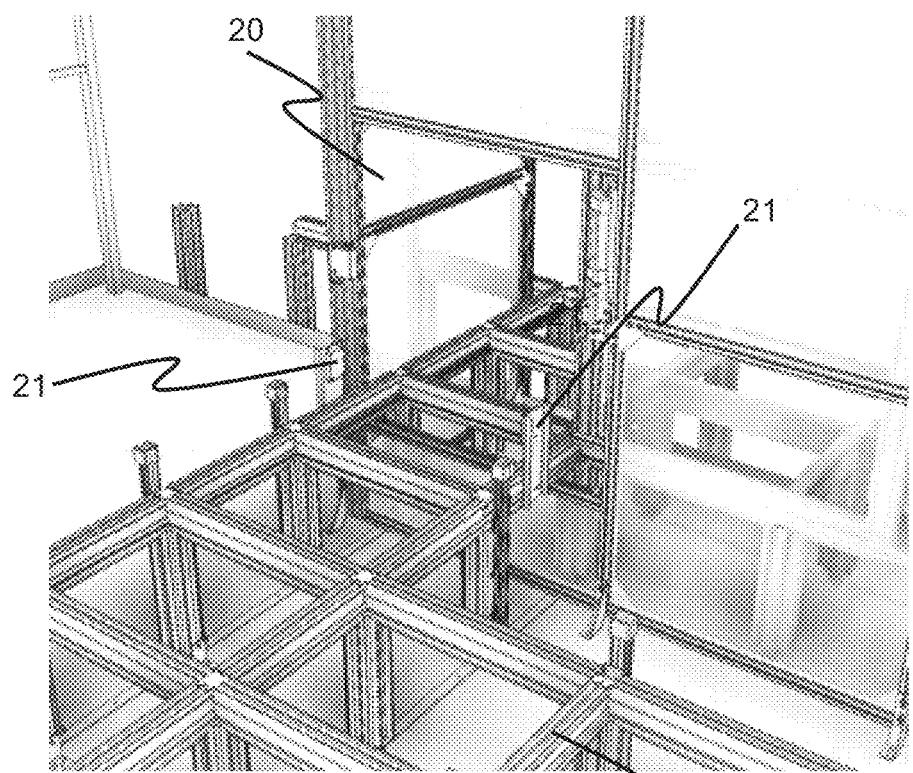
FIG. 9 illustrates a service grid comprising two readers arranged opposite each other on a service grid cell.

FIG. 9 shows a vehicle passage comprising two readers 21. The readers 21 are arranged opposite each other on a service grid cell to identify the remotely operated vehicle passing in the first direction (X) or they may be arranged opposite each other on the service grid cell to identify the remotely operated vehicle passing in the second direction (Y) (not shown).

Figure 10:
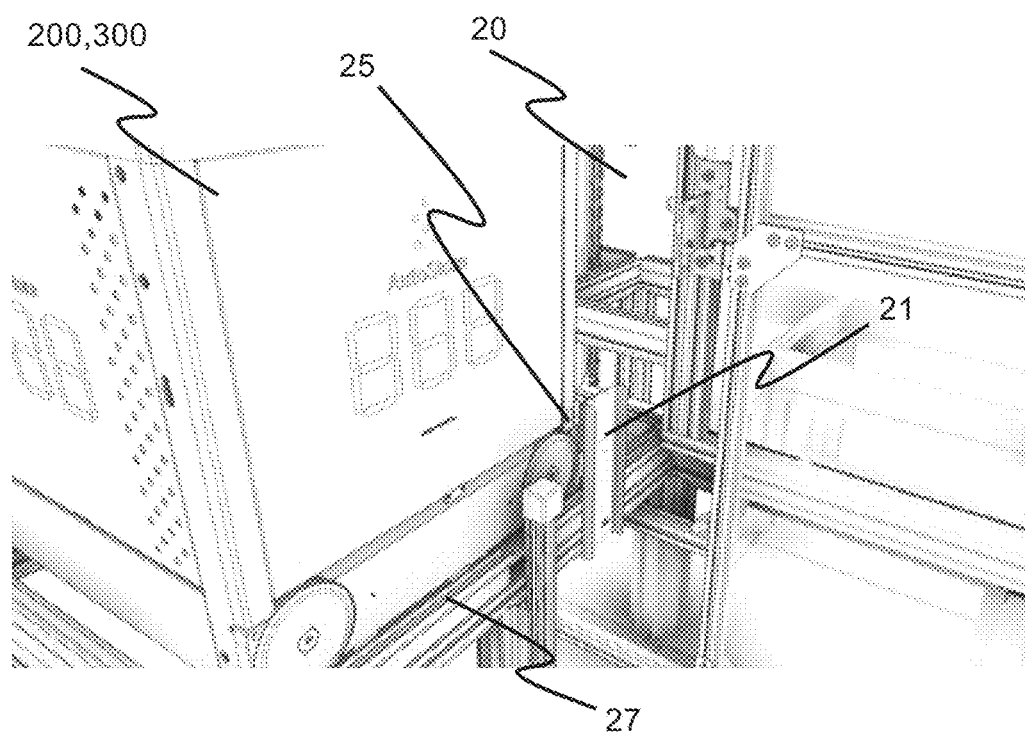
FIG. 10 illustrates a reader connected to the rail of a service grid and arranged for reading a label located on the remotely operated vehicle.

FIG. 10 shows a container handling vehicle comprising a label 25 situated at the lower part at one of the sides. The reader 21 is arranged in a plane above the horizontal plane (P1) of the service rail system 27, such that it can easily read the label 25 on the vehicle 200,300.

The remotely operated vehicle 200,300 comprises a front part, a back part and two side parts, and wherein a first label may be arranged at one side part such that the label can be read by one of the readers in the second direction (Y).

The remotely operated vehicle 200,300 comprises a front part, a back part and two side parts, and wherein a second label is arranged at the front part or the back part such that the second label can be read by one of the readers in the first direction (X).

The above location of the labels 25 allows at least one of the two readers 21 in FIG. 9 to read the label 25 either on the front or back side, or at one of the sides.

The reader 21 may therefore be able to read the label 25 and clarify in what position the vehicle 200,300 is entering the service grid and/or exiting. For example, in the illustrated embodiment the vehicle may enter the service grid in a forward-facing direction or it can enter the service grid 150 in a backwards facing direction (turned 180°). In the case the label is located at a left side of the vehicle, the reader at the left side will read the label and the vehicle facing direction will be detected. If the vehicle is turned 180°, the reader at the right side will be able to read said label and detect that the vehicle has turned 180°.

The system may be operated such that it automatically registers a vehicle moving in or out of the service area. Thus, the reader registers vehicles 200,300 passing through the vehicle passage.

The above-mentioned embodiment for reading the at least one label 25 of a container handling vehicle 200,300 is also transferable to a delivery vehicle 30 operating on a delivery rail system 50. Thus, all of the above-mentioned preferred features described in relation to container handling vehicles apply equally to delivery vehicles.

The reader 21 may be a sensor adapted to read the individual information provided in the at least one label 25 attached to each of the remotely operated vehicles 30,200, 300. The label 25 may be a passive id (rfid, bar code, etc.) which may increase the reliability of the detection system since it can detect a vehicle 30,200,300 in an "off-state" which has been manually moved through the vehicle passage.

Figure 11:
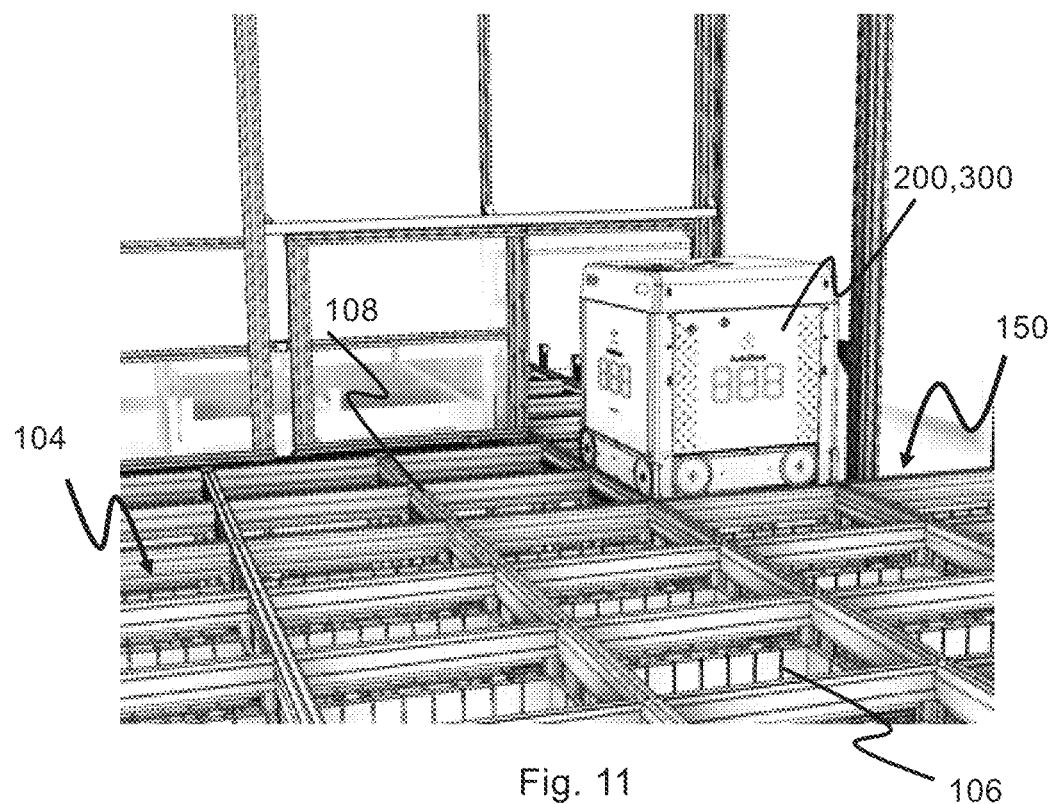
FIG. 11 illustrates a main storage grid comprising a main grid and wherein the remotely operated vehicle may enter a service area through a port.
Figure 12:
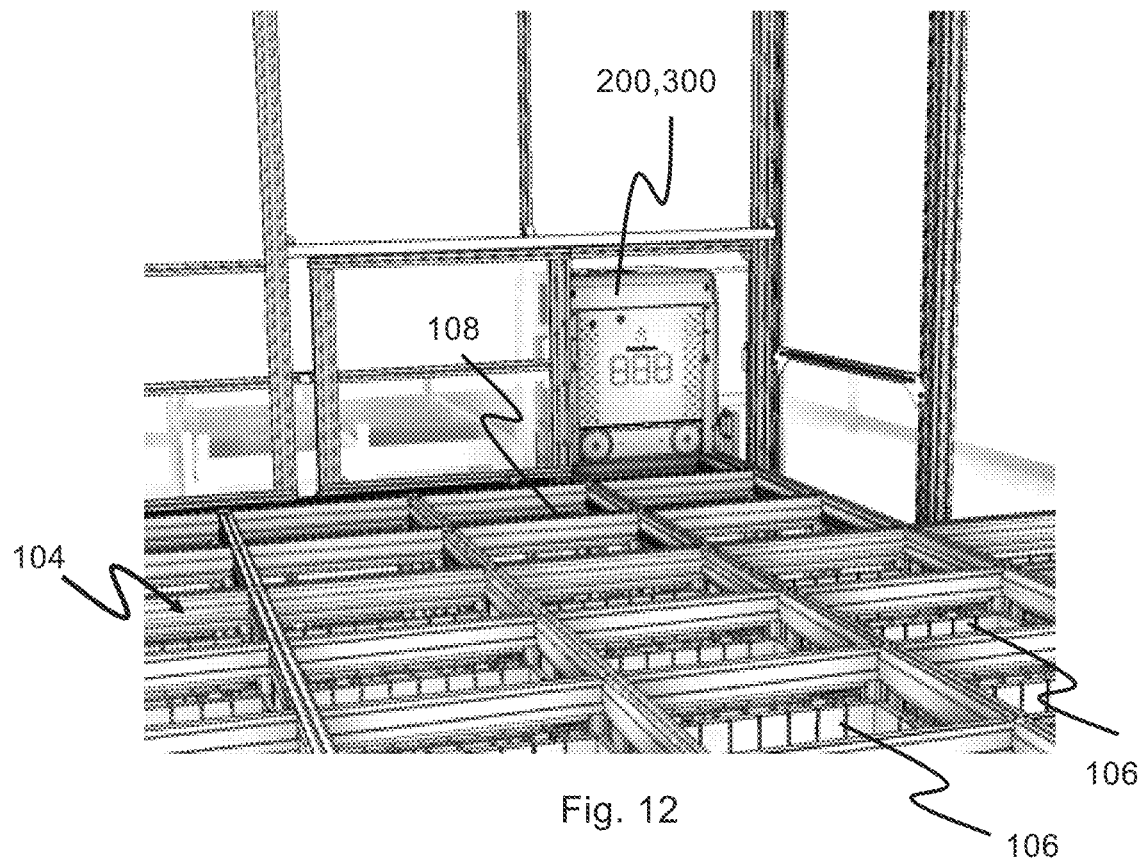
FIG. 12 illustrates the embodiment of FIG. 11 while the remotely operated has entered the service area through the port.

FIGS. 11 and 12 illustrates a container handling vehicle 200,300 moving into a service grid 150 from a storage grid 104. The service grid 150 may be separated from the storage grid 104 by walls and a gateway, though which the vehicle 200,300 may pass in order to enter or exit the service grid 150.

REFERENCE NUMERALS

21 Reader
25 Label
27 Service rail system
30 Delivery vehicle
50 Delivery rail system
51 First set of parallel rails
52 Second of parallel rails
53 Delivery grid
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
125 Delivery grid
140 Delivery system
150 Service grid
200 First container handling vehicle
300 Second container handling vehicle
X First direction
Y Second direction
P Horizontal plane of rail system

The invention claimed is:

1. An automated storage and retrieval system comprising:
a plurality of remotely operated vehicles,
a main grid in which the plurality of remotely operated vehicles operates,
a service grid for placement of remotely operated vehicles for service, and
a control system for controlling the plurality of remotely operated vehicles, the control system comprising a data record for the status of a vehicle state for each vehicle,
wherein the main grid comprises a main rail system comprising at least a first set of parallel rails arranged in a horizontal plane and extending in a first direction (X), and at least a second set of parallel rails arranged in the horizontal plane and extending in a second direction (Y) which is orthogonal to the first direction (X), the first and second sets of rails together defining the main grid of main grid cells,
wherein the service grid comprises a service rail system comprising at least a first set of parallel rails arranged in a horizontal plane and extending in a first direction (X), and at least a second set of parallel rails arranged in the horizontal plane and extending in a second direction (Y) which is orthogonal to the first direction (X), the first and second sets of rails together defining the service grid of service grid cells,
wherein the main grid is connected to the service grid such that the plurality of remotely operated vehicles can enter or exit the service grid from or to the main grid,
wherein each remotely operated vehicle comprises at least one label comprising individual remotely operated vehicle information, wherein the service grid comprises at least one reader for reading the at least one label of each remotely operated vehicle so as to identify each remotely operated vehicle passing the at least one reader, and wherein the control system is arranged to receive a signal from the reader and, upon receipt, compare the data record with an observed vehicle state of the identified remotely operated vehicle and indicate to an operator that a difference exists between the observed vehicle state and the vehicle state on the control system.

2. The automated storage and retrieval system according to claim 1, wherein the at least one reader is arranged in a plane above the horizontal plane of the service rail system.

3. The automated storage and retrieval system according to claim 1, wherein a location of the at least one reader in the service rail system defines, at least in part, a vehicle passage at which each remotely operated vehicle crossing the vehicle passage is identified by the at least one reader reading the at least one label.

4. The automated storage and retrieval system according to claim 3, wherein the at least one reader is positioned at a point of entry or exit of the service grid.

5. The automated storage and retrieval system according to claim 3, wherein the vehicle passage comprises the at least one reader connected to the service grid cell in the first direction (X) or in the second direction (Y).

6. The automated storage and retrieval system according to claim 5, wherein the vehicle passage comprises two readers arranged opposite each other on the service grid cell in the first direction (X) or opposite each other on the service grid cell in the second direction (Y).

7. The automated storage and retrieval system according to claim 6, wherein the remotely operated vehicle comprises a front part, a back part and two side parts, and wherein the at least one label comprises a first label arranged at one side part such that the first label can be read by one of the readers as the remotely operated vehicle passes in the second direction (Y).

8. The automated storage and retrieval system according to claim 6, wherein the remotely operated vehicle comprises a front part, a back part and two side parts, and wherein the at least one label comprises a second label arranged at the front part or the back part such that the second label can be read by one of the readers as the remotely operated vehicle passes in the first direction (X).

9. The automated storage and retrieval system according to claim 1, wherein the at least one reader is a RFID reader and the at least one label is a RFID label.

10. The automated storage and retrieval system according to claim 1, wherein the main grid is a storage grid and the plurality of remotely operated vehicles are container handling vehicles.

11. The automated storage and retrieval system according to claim 1, wherein the main grid is a delivery grid and the plurality of remotely operated vehicles are delivery vehicles.

12. A method of identifying a remotely operated vehicle in an automated storage and retrieval system, the automated storage and retrieval system comprising:

a plurality of remotely operated vehicles, a main grid in which the plurality of remotely operated vehicles operates, a service grid for placement of remotely operated vehicles for service, a control system for controlling the plurality of remotely operated vehicles, the control system comprising a data record for the status of a vehicle state for each vehicle, wherein the main grid comprises a main rail system comprising at least a first set of parallel rails arranged in a horizontal plane and extending in a first direction (X), and at least a second set of parallel rails arranged in the horizontal plane and extending in a second direction (Y) which is orthogonal to the first direction (X), the first and second sets of rails together defining the main grid of main grid cells, wherein the service grid comprises a service rail system comprising at least a first set of parallel rails arranged in a horizontal plane and extending in a first direction (X), and at least a second set of parallel rails arranged in the horizontal plane and extending in a second direction (Y) which is orthogonal to the first direction (X), the first and second sets of rails together defining the service grid of service grid cells, and wherein the main grid is connected to the service grid such that the plurality of remotely operated vehicles can enter or exit the service grid from the main grid, each remotely operated vehicle comprises at least one label comprising individual remotely operated vehicle information, and wherein the service grid comprises at least one reader for reading the at least one label of each remotely operated vehicle such as to identify each remotely operated vehicle, the method comprising:

operating or moving the remotely operated vehicle on the main rail system towards the service grid, utilizing the at least one reader of the service grid, to read the vehicle information comprised in the at least one label of the remotely operated vehicle passing the at least one reader, wherein the control system is arranged for receiving a signal from the reader and, upon receipt, compare the data record with an observed vehicle state of the identified remotely operated vehicle and indicate to an operator that a difference exists between the observed vehicle state and the vehicle state on the control system.

13. The method according to claim 12, wherein the at least one reader is a RFID reader and the at least one label is a RFID label.

14. The method according to claim 12, wherein the main grid is a storage grid and the plurality of remotely operated vehicles are container handling vehicles.

15. The method according to claim 12, wherein the main grid is a delivery grid and the plurality of remotely operated vehicles are delivery vehicles.

* * * * *